United States Patent Office 2,711,930
Patented June 28, 1955

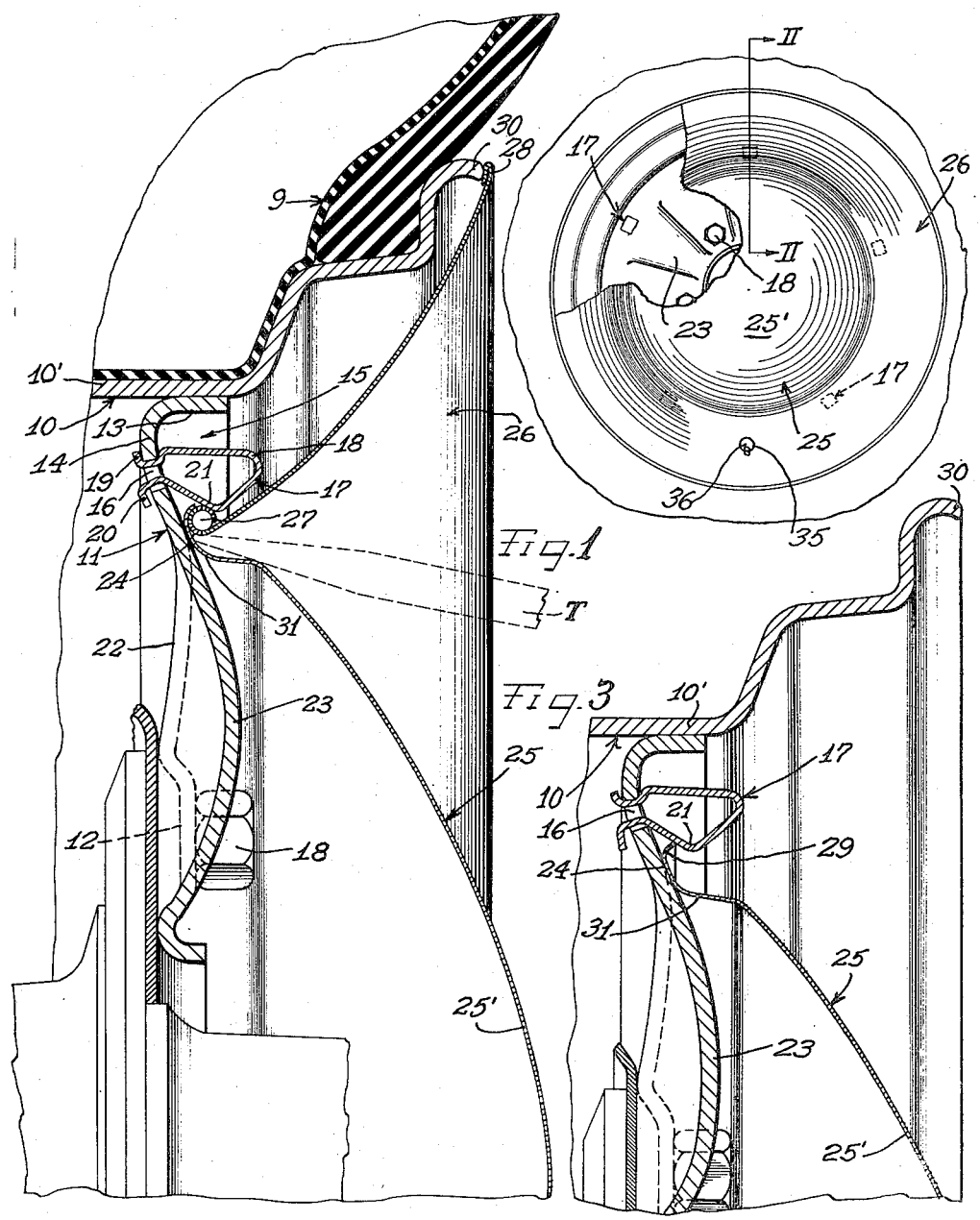

2,711,930
WHEEL COVER

George Albert Lyon, Detroit, Mich.

Application July 17, 1950, Serial No. 174,251

4 Claims. (Cl. 301—37)

This invention relates to a wheel structure and more particularly to ornamental wheel trim for automobile wheels.

An object of this invention is to provide in a wheel structure an improved way of retaining an ornamental wheel cover on the wheel and yet at the same time not detract from the strength of the wheel body or spider on which the cover is retainingly held.

Another object of this invention is to provide in a wheel structure an improved wheel body or spider with cover retaining means so interrelated therewith that the strength of the wheel body is not detracted from, but on the contrary, may be enhanced.

As is well known in the art, it is the practice to provide an automobile wheel body with cover retaining spring clips, but in so doing, the body must not be weakened from the standpoint of it being able to carry the full load to which it is subjected in normal wheel operation. It has been found that where the wheel body is weakened, as by reason of improperly located apertures or poor design, it will not be able to stand up under the terrific impacts to which it is subjected in usage.

For the foregoing and other reasons, I aim to so interrelate my cover retaining means with the wheel body that it will not be detrimental to the strength or mechanical design of the body.

Also, by reason of the particular construction of wheel body I have evolved, I am enabled to have a wheel cover in the form of a trim ring extend further into the body of the wheel, thus making available a greater mass of highly lustrous surface which will add to the ornamental effect of the trim ring.

In accordance with the general features of this invention, there is provided in a wheel structure comprising a multi-flanged tire rim including a base flange, a body part for supporting the rim attached to the rim base flange and being flanged and recessed radially inward of the base flange to provide a wheel cover retaining pocket; the body part flange having spaced apertures in which spring clips are inserted and yieldably held therein, each with a looped end projecting into the pocket in a position for retaining cooperation with an edge of a wheel cover inserted in the pocket.

Another feature of the invention relates to the disposition of the clip means so that same can be selectively used to hold either a central circular cover on the wheel or an outer annular trim ring or both of them together in nested relationship, as desired.

Yet another feature of the invention relates to the ribbing of the body part radially inwardly of the pocket so as to provide at its junction with the pocket a reinforced shoulder against which the cover members can bear when retained on the wheel by the spring clips.

Other objects and features of this invention will more fully appear from the following detailed description taken in connection with the accompanying drawing which illustrates a single embodiment thereof and in which Figure 1 is a fragmentary side view of a wheel structure showing my novel cover assembly applied thereto and partly broken away to show one of the spring clips;

Figure 2 is an enlarged fragmentary cross-sectional view taken on substantially the line II—II of Figure 1 looking in the direction indicated by the arrows and showing by dotted lines how a screw driver or pry-off tool is applied to the cover assembly; and Figure 3 is a fragmentary sectional view similar to Figure 2 but with the outer trim ring removed and illustrating how the spring clips cooperate in holding the central cover on the wheel after removal of the trim ring.

As shown on the drawing:

The reference character 9 designates generally a conventional pneumatic tire and tube assembly mounted in the usual way upon a conventional so-called multi-flanged drop center type of tire rim 10. This tire rim, as is well known in the automobile wheel art, is carried on a central body part or spider designated generally by the reference character 11 and which includes the usual central bolt-on flange by means of which the wheel may be detachably fastened to a drum assembly, or the like, as by means of cap screws 8.

The body part 11, in accordance with the features of this invention, is substantially flatter than in current types of wheels in that it is not bulged axially outwardly to the same extent as in present day wheel spiders. I find that I can, by properly shaping and reinforcing this body part, use less metal in it than is true in current designs and yet at the same time not detract from its ability to take care of the strains and loads to which it is subjected in use.

In addition, I find that there is a nicety of interrelationship between the constructional configuration of this body part and the ornamental wheel trim which, as here shown, enables the use of wheel trim to greater advantage from the standpoint of providing a greater expanse of lustrous surface for ornamentation of the wheel.

This body part 11, as shown, has an outer turned flange 13 fastened as by means of welding or the like to the base flange 10' of the rim part and is of such extent that it, together with an adjoining flange portion 14, defines an annular pocket 15 facing axially outwardly for the reception of my wheel trim or cover members. This pocket is disposed at the axially outer side of the base flange and in such position as not to interfere with the proper location of the brake mechanism or the cooling of the same. To put it another way, the flanged periphery of the body part is axially outwardly of the medial plane of the wheel.

The flanged portion 14 is provided with a series of spring clip receiving apertures 16 circumferentially spaced about the axis of the wheel (Figure 1). They may be of any suitable number, such, for example, as 3 to 5, although I have shown 5 in this embodiment.

Cooperable with each of these apertures is a cover retaining spring clip designated by the reference character 17. Since these clips are all identical, a description of one will suffice for all.

Each clip 17 comprises a strip of spring metal turned back upon itself into two legs to form a loop 18 with the extremities of the legs 19 and 20 projecting into the cooperating apertures 16 and hooked over the edges of the apertures. The aperture 16 is of such width that the clip legs 19 and 20 may be squeezed toward each other when it is desired to pull the clip out of the aperture.

In addition, there is sufficient clearance for the radially inner leg 20, which has a hump or shoulder 21, to resiliently yield when engaged in cam-like manner by the edge or edges of the wheel covers to be hereinafter described. This leg 20 must be yieldable since when it is in cover retaining engagement, it is slightly deflected radially outwardly so as to apply a tensioned pressure against the cooperating cover edge for detachably holding the cover on the wheel.

It will also be perceived that the main portion 22 of the body part 11 extends radially inwardly to the mounting flange 12. This body portion 22 is reinforced by a series of radial ribs 23 which are slightly bulged axially outwardly and terminate substantially at the junction of the portion 22 with the pocket 15; thus junction point being designated by the reference character 24 and defining a shoulder on which the cover edges bottom when the covers are applied to the wheel.

The covers of my invention include a central circular cover member 25 and an outer cover or ring member 26 which may be made from any suitable sheet material such, for example, as thin gauge stainless steel sheet. Excellent results may be obtained by using stainless steel strip of .020 gauge.

The central cover member 25 which comprises a stamping is of generally convex concave cross-section so as to define a central curved crown portion 25' and a marginal turned flange 29 which defines a channel for receiving the turned or rolled inner edge 27 of the trim ring 26 whereby the two may be held in telescoping or nested relationship on the wheel.

The trim ring 26 is likewise of a convex concave cross-sectional configuration and includes an outer turned edge 28 which may or may not, as desired, bear against a turned terminal flange 30 of the rim part 10.

It should be noted that at 31 the channeled margin 29 is provided with an annular opening between the cover 25 and the turned edge 27 of the trim ring 26 so that a screw driver or pry-off tool T can be inserted therein for effecting removal of the trim ring.

Also, the trim ring 26 is provided with a hole 35 through which the conventional valve stem 36 of the tire and tube assembly 9 can extend so as to be accessible on the exterior of the trim ring.

In the application of my novel cover assembly to the wheel, the central cover 25 is first pressed against the wheel with its outer channeled edge 29 bearing against the humps 21 of the spring clips 17. A slight pressure against the cover inwardly results in the radial inner legs 20 of the clips yielding outwardly so that the edge 29 can be cammed over the humps to the position shown in Figure 3. Axial inward movement of the cover 25 is limited by the channel portion 29 coming to rest on the shoulder 24 of the body part at the outer ends of the ribs 23; these ribs in effect also serving to guide the cover into central retained position on the wheel. As noted before, when in this position the radially inner legs 20 of the clips have been slightly displaced so that they are exerting resiliently gripping pressure against the turned or channeled edge 29 of the central cover.

Thereafter, the trim ring 26 is placed over the outer side of the wheel with its hole 35 in registry with the valve stem 36 and with its turned inner edge 27 opposite the spring clips. A slight axial inward pressure on the trim ring results in the camming of the edge 27 over the humps 21 of the clips and into seated or nested engagement inside the channel portion 29 of the central cover member 25.

It should be noted that the trim ring 26 can be used alone without the central cover member since in that event the spring clips will wedge the turned inner edge 27 of the trim ring against the shoulder 24 and ribs of the body part and hold it on the wheel. Thus my wheel structure permits of the selective use of either the wheel cover 25 or the trim ring 26 or of both of them together, as shown in Figure 2.

When it is desired to remove the assembly, the blunt end of a pry-off tool T is inserted in the opening 31 under the turned inner edge 27 and upon a slight twisting motion forcibly ejects the trim ring from its retaining cooperation with the clips. Thereafter (Figure 3) a pry-off tool can be inserted under the outer edge of the channel portion 29 of the central cover 25 for forcibly prying this cover off of the clips.

If it is so desired, any one of the spring clips may be easily removed by pressing its legs together and withdrawing its ends axially outwardly through the aperture 16.

Now it will be further perceived that the aperturing of the body part at 16 is counteracted from the standpoint of rigidification by the ribs 23 which strengthen the body part without causing it to bulge outwardly to such an extent as to restrict the depth of the wheel covers that can be used. Actually, as shown in Figure 2 both cover members can extend axially inwardly to a greater extent in this structure than is true in existing wheel assemblies on the market so that a very large expanse of lustrous area is available and visible for the ornamenting or highlighting of the wheel.

It will be understood that modifications and variations may be effected without departing from the scope of the novel concepts of the present invention.

I claim as my invention:

1. In a wheel structure comprising a multi-flanged tire rim including a base flange, a body part for supporting the rim attached to said rim base flange, said body part being flanged and recessed radially inward of said base flange to provide a wheel cover retaining pocket, said body part flange having spaced clip receiving apertures, spring clips inserted in said apertures and yieldably held therein each with a looped end projecting into said pocket, a circular wheel cover having an edge extending into said pocket and resiliently engaged by said looped clip ends for detachable retention on the wheel, said body part having radial ribs inwardly of the pocket and providing at their junction with the pocket shoulder means against which the cover edge can bottom.

2. In a wheel structure comprising a multi-flanged tire rim including a base flange, a body part for supporting the rim attached to said rim base flange, said body part being flanged and recessed radially inward of said base flange to provide a wheel cover retaining pocket, said body part flange having spaced clip receiving apertures, spring clips inserted in said apertures and yieldably held therein each with a looped end projecting into said pocket, a circular wheel cover having an edge extending into said pocket and resiliently engaged by said looped clip ends for detachable retention on the wheel, and a second wheel cover in the form of a trim ring having a radially inner edge extending into said pocket and nesting in the edge of the circular wheel cover member for resilient retaining engagement by the spring clips whereby both cover members are held against the body part by the clips.

3. In a wheel structure comprising a multi-flanged tire rim including a base flange, a body part for supporting the rim attached to said rim base flange, said body part being flanged and recessed radially inward of said base flange to provide a wheel cover retaining pocket, said body part flange having attached thereto in said pocket a plurality of spring clips each with a looped end projecting axially outward into said pocket and an annular trim ring extending radially and axially outwardly of said pocket and having a radially inner edge bottomed against said body part and resiliently engaged by said looped clip ends for detachable retention on the wheel, said body part having radial ribs inwardly of the pocket and providing at their junction with the pocket a shoulder on which the inner edge of said trim ring is bottomed.

4. In a wheel structure comprising a multi-flanged tire rim including a base flange, a body part supporting the rim attached to said base flange, said body part being flanged and recessed radially inward of said base flange to provide a wheel cover retaining pocket, spring finger means carried by said body part with a yieldable cover engaging portion projecting into said pocket, and a circular wheel cover having an edge extending into said pocket and resiliently engaged by said cover engaging portion for detachable retention on the wheel, said body part having radial ribs inwardly of the pocket and providing at their junction with the pocket shoulder means against which the cover edge can bottom.

References Cited in the file of this patent

UNITED STATES PATENTS

| Number | Name | Date |
|---|---|---|
| Re. 22,119 | Lyon | June 16, 1942 |
| 2,086,288 | Van Uum | July 6, 1937 |
| 2,088,109 | Horn | July 27, 1937 |
| 2,190,669 | Lyon | Feb. 20, 1940 |
| 2,217,116 | Hunt et al. | Oct. 8, 1940 |
| 2,333,626 | Aske | Nov. 9, 1943 |
| 2,401,492 | Lyon | June 4, 1946 |
| 2,447,516 | Lyon | Aug. 24, 1948 |
| 2,470,559 | Horn | May 17, 1949 |
| 2,567,142 | Barker | Sept. 4, 1951 |
| 2,605,530 | Slemmons | Aug. 5, 1952 |